United States Patent
Pan et al.

(10) Patent No.: US 9,137,003 B2
(45) Date of Patent: Sep. 15, 2015

(54) METHOD AND DEVICE FOR ENABLING MULTI-CARRIERS AGGREGATION TRANSMISSION

(75) Inventors: Xueming Pan, Beijing (CN); Guojun Xiao, Beijing (CN); Yu Ding, Beijing (CN); Shiqiang Suo, Beijing (CN); Shaohui Sun, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 452 days.

(21) Appl. No.: 13/127,539

(22) PCT Filed: Nov. 4, 2009

(86) PCT No.: PCT/CN2009/074783
§ 371 (c)(1),
(2), (4) Date: Jul. 14, 2011

(87) PCT Pub. No.: WO2010/051752
PCT Pub. Date: May 14, 2010

(65) Prior Publication Data
US 2011/0261714 A1 Oct. 27, 2011

(30) Foreign Application Priority Data

Nov. 4, 2008 (CN) .......................... 2008 1 0226037
Nov. 4, 2008 (CN) .......................... 2008 1 0226038

(51) Int. Cl.
*H04W 72/04* (2009.01)
*H04L 5/00* (2006.01)
*H04L 5/14* (2006.01)

(52) U.S. Cl.
CPC .............. *H04L 5/0092* (2013.01); *H04L 5/001* (2013.01); *H04L 5/0094* (2013.01); *H04L 5/1469* (2013.01); *H04L 5/0037* (2013.01); *H04L 5/0053* (2013.01); *H04L 5/0064* (2013.01); *H04L 5/0069* (2013.01)

(58) Field of Classification Search
None
See application file for complete search history.

(56) References Cited

U.S. PATENT DOCUMENTS

| 2008/0144612 A1* | 6/2008 | Honkasalo et al. ........... 370/370 |
| 2010/0227569 A1* | 9/2010 | Bala et al. ....................... 455/73 |

* cited by examiner

*Primary Examiner* — Huy D Vu
*Assistant Examiner* — Teisha D Hall
(74) *Attorney, Agent, or Firm* — Hoffmann & Baron, LLP (57) ABSTRACT

The present invention discloses a transmission method with multi-carrier aggregation, which includes: performing uplink and downlink configurations for each of the component carriers aggregated in a cell and ensuring coexistence of at least one identical uplink sub-frame and at least one identical downlink sub-frame between at least two of the component carriers and compliance of the configuration of at least one of the component carriers with an uplink and downlink configuration of R8; and transmitting the uplink and downlink configuration of any one of the component carriers and those of the other component carriers aggregated with the any one component carrier to an LTE-A UE accessing the corresponding component carrier. The invention further provides a transmission device with multi-carrier aggregation. With the invention, uplink and downlink configurations in an LTE-A system can be performed to accommodate a demand of a TDD system.

19 Claims, 8 Drawing Sheets

METHOD AND DEVICE FOR ENABLING MULTI-CARRIERS AGGREGATION TRANSMISSION

FIELD OF THE INVENTION

The present invention relates to the Long Term Evolution (LTE) project of third generation mobile communication and carrier aggregation technology and in particular to an uplink and downlink configuration and reception method for carrier aggregation in a Time Division Duplex (TDD) system.

BACKGROUND OF THE INVENTION

Figure 1:
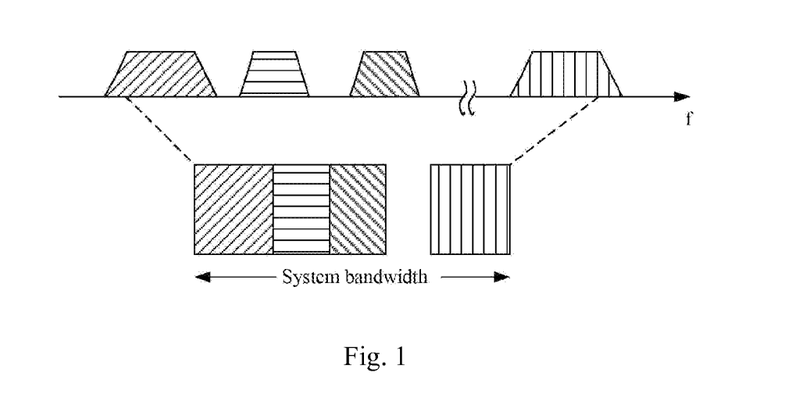
FIG. 1 is a schematic diagram of non-contiguous carrier aggregation in an LTE-A system.

In an LTE-Advanced (LTE-A) system, resources of a plurality of LTE carriers have to be linked for use, which is referred to as multi-carrier aggregation, so as to support a wider system bandwidth, e.g., 100 MHz, than that of the LTE system, where each of the LTE carriers is referred to a component carrier. Multi-carrier aggregation particularly relates to three approaches:

(1) Contiguous LTE carriers across a plurality of frequency bands are aggregated for a wider transmission bandwidth of the LTE-A;

(2) Non-contiguous LTE carriers across a plurality of frequency bands are aggregated for a wider transmission bandwidth of the LTE-A. FIG. 1 illustrates an example of non-contiguous multi-carrier aggregation, where LTE carriers non-contiguous across four frequency bands are aggregated for a transmission bandwidth of the system.

(3) Some of component carriers for multi-carrier aggregation are contiguous and some others are non-contiguous across frequency bands.

At present, the research of the standardization organization demonstrates a preferred solution in which a design over each component carrier is kept as consistent as possible with LTE Release 8 (R8) to thereby ensure normal operation of an R8 terminal over each component carrier.

In the TDD mode of LTE Release 8, asymmetric amounts of traffic required over the uplink and the downlink are accommodated by different uplink and downlink configurations, and Table 1 depicts various configurations of allocating uplink and downlink sub-frames. In a TDD system, a base station has to broadcast information on current allocation of uplink and downlink sub-frames in a current cell to the cell, and a TDD terminal can perform normal transmission and reception of data only upon reception of the information.

TABLE 1

Different Uplink and Downlink Configuration Schemes of LTE-TDD System

| Uplink-Downlink Configuration Scheme | Length of Time of Transition from Downlink to Uplink | Sub-frame No | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In an Orthogonal Frequency Division Multiplexing (OFDM) system, a Cyclic Prefix (CP) typically with a larger length than the maximum delay spread of a radio channel is used to obviate a multi-path effect over the radio channel and thus prevent multi-path incurred inter-symbol interference. Different lengths of a cyclic prefix are adopted to support different channel scenarios, that is, a long CP is used for a scenario with a large multi-path delay (e.g., a scenario with large coverage) and a short CP is used for a scenario with a small multi-path delay (e.g., a scenario with small coverage).

Two types of CP, i.e., a normal CP and an extended CP, with corresponding specific parameters as depicted in Table 2 are defined for uni-cast transmission in LTE R8, where a sub-frame of the normal CP is configured to include seven OFDM symbols including the first one with a CP length of 160 and the other ones with a CP length of 144, and a sub-frame of the extended CP is configured with OFDM symbols each with a CP length of 512. As can be apparent, the extended CP with a larger length offers better multi-path resistance while the number of OFDM symbols available for data transmission is reduced correspondingly per unit of time (e.g., per sub-frame), which means a larger overhead of the system. Therefore a CP configuration scheme has to be performed as needed to deploy a network in practice. The CP configuration scheme refers to whether the normal or extended CP is adopted for the CP of a sub-frame.

TABLE 2

| Configuration Type | The Number of OFDM Symbols in Sub-frame $N_{symb}^{UL}$ | CP Length $N_{CP,l}$ |
|---|---|---|
| Normal CP | 7 | 160 for l = 0 (The First OFDM Symbol in Sub-frame) |
| | | 144 for l = 1, 2, . . . , 6 (The other OFDM symbols in Sub-frame) |
| Extended CP | 6 | 512 for l = 0, 1, . . . , 5 |

CP configuration schemes of uplink and downlink signals differ in LTE R8. The downlink CP configuration scheme of a cell is detected by a UE through searching for the cell, and particularly, a delay relative to a synchronization signal is detected, and if the delay is larger than a preset threshold, then the long extended CP is adopted; otherwise, the short normal CP is adopted. The uplink CP configuration scheme of the cell is broadcasted from the cell to the UE.

In summary, the issue of uplink and downlink configurations over different carriers in the TDD mode has not been considered in the current LTE-A system design so that a relevant solution is absent and normal operation of an R8 terminal over each component carriers can not be ensured. Furthermore, a CP length configuration scheme of each component carrier has to be considered in the LTE-A system with introduction of multi-carrier aggregation, but just a uni-carrier CP length configuration is considered for a CP configuration scheme adopted in the LTE R8 system, thus making it impossible to be easily applied to the LTE-A system.

SUMMARY OF THE INVENTION

In view of the above, embodiments of the invention propose a transmission method and device with multi-carrier aggregation, which can perform an uplink and downlink configuration in an LTE-A system to accommodate a demand of a TDD system.

An embodiment of the invention proposes a transmission method with multi-carrier aggregation including:

performing uplink and downlink configurations for each of the component carriers aggregated in a cell and ensuring coexistence of at least one identical uplink sub-frame and at least one identical downlink sub-frame between at least two of the component carriers and compliance of the configuration of at least one of the component carriers with an uplink and downlink configuration of R8; and transmitting the uplink and downlink configuration of any one of the component carriers and those of the other component carriers aggregated with the any one component carrier to an LTE-A UE accessing the corresponding component carrier.

An embodiment of the invention proposes another transmission method with multi-carrier aggregation including receiving, by an LTE-A UE, over an access carrier thereof, an uplink and downlink configuration of the access carrier and those of other component carriers aggregated with the access carrier transmitted from a base station.

Preferably, the LTE-A UE is scheduled over sub-frames in which the aggregated component carriers have the same transmission direction, when the LTE-A UE intends to receive or transmit data simultaneously over a plurality of carriers.

A correspondence relationship table between each component carrier subject to the multi-carrier aggregation and lengths of cyclic prefixes configured for the component carrier is preconfigured at the LTE-A UE, and the step of scheduling the LTE-A UE over sub-frames, all of which are in the uplink or downlink, over a plurality of aggregated component carriers includes:

performing, by the LTE-A UE, Inverse Discrete Fourier Transform on data over each component carrier to acquire Orthogonal Frequency Division Multiplexing symbols over the respective component carrier; and inserting, by the LTE-A UE, a cyclic prefix in the time domain of each of the component carriers according to the preconfigured correspondence relationship table so that the cyclic prefix and a predetermined number of OFDM symbols over the component carrier constitute a sub-frame.

An embodiment of the invention proposes a transmission device with multi-carrier aggregation including:

a configuration module configured to perform uplink and downlink configurations for each of the component carriers aggregated in a cell and ensuring coexistence of at least one identical uplink sub-frame and at least one identical downlink sub-frame between at least two of the component carriers and compliance of the configuration of at least one of the component carriers with an uplink and downlink configuration of R8; and a transmission module configured to transmit the uplink and downlink configuration of any one of the component carriers and those of the other component carriers aggregated with the any one component carrier to an LTE-A UE accessing the corresponding component carrier.

The solution of the invention performs uplink and downlink configurations for each of the component carriers aggregated in a cell and ensuring coexistence of at least one identical uplink sub-frame and at least one identical downlink sub-frame between at least two of the component carriers to thereby ensure the provision of a wider system bandwidth in an LTE-A system and also the compliance of the configuration of at least one of the component carriers with an uplink and downlink configuration of R8 to thereby ensure backward compatibility with R8. After the configurations are performed as described above, the uplink and downlink configuration of any one of the component carriers and those of the other component carriers aggregated with the any one component carrier are transmitted to an LTE-A UE to enable the LTE-A UE to acquire the uplink and downlink configurations and thereby perform proper transmission and reception of data.

Furthermore, a correspondence relationship table between respective component carriers and cyclic prefixes configured for the component carriers is preconfigured and cyclic prefixes are inserted in the time domain of the each component carrier according to the correspondence relationship table so as to configure the each component carrier, subject to multi-carrier aggregation, with the cyclic prefixes which may be the same or different. The invention addresses the issue of configuring CP lengths over each of the carriers for LTE-A transmission with carrier aggregation.

DETAILED DESCRIPTION OF THE INVENTION

The invention will be further described in details below with reference to the drawings to make the objects, aspects and advantages of the invention more apparent. The invention will be further set forth below with reference to the drawings to make the objects, aspects and advantages of the invention more apparent. For convenience of the following description, a UE applicable only to an LTE R8 system and supporting uni-carrier instead of multi-carrier aggregation will be referred to an LTE R8 UE, and a UE applicable to an LTE-A system and supporting multi-carrier aggregation will be referred to an LTE-A UE.

Figure 2:
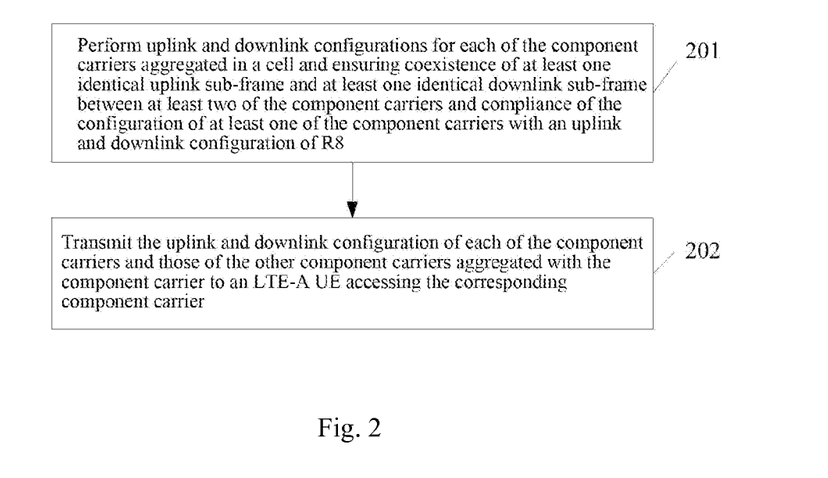
FIG. 2 is a general flow chart of an uplink and downlink configuration method for carrier aggregation of a TDD system according to the invention.

FIG. 2 is a general flow chart of an uplink and downlink configuration method for carrier aggregation of a TDD system according to the invention. As illustrated in FIG. 2, the method includes:

The step 201 is to perform uplink and downlink configurations for each of the component carriers aggregated in a cell and ensuring coexistence of at least one identical uplink sub-frame and at least one identical downlink sub-frame between at least two of the component carriers and compliance of the configuration of at least one of the component carriers with an uplink and downlink configuration of R8.

The invention proposes that uplink and downlink configurations over each of the component carriers can be configured independently for an LTE-A TDD system, that is, cases may occur as follows, the uplink and downlink configurations over each of the component carriers are all identical or the uplink and downlink configurations over each of the component carriers are different or the uplink and downlink configurations over each of the component carriers are partially identical.

Preferably, since there may be another adjacent-frequency TDD system on the component carrier, it is required that the uplink and downlink configurations of the component carriers be performed so that the uplink and downlink configuration of each of the component carriers satisfies a requirement on coexistence with that of its adjacent frequency (that is, uplink and downlink allocation of the carrier should be restricted to some extent) in order to accommodate a requirement between the adjacent-frequency carriers and ensure normal operation of each system. A specific requirement on coexistence and restriction on an uplink and downlink configuration can be the same as those in the prior art, for example, as described in FIG. 3 and FIG. 4.

Figure 3:
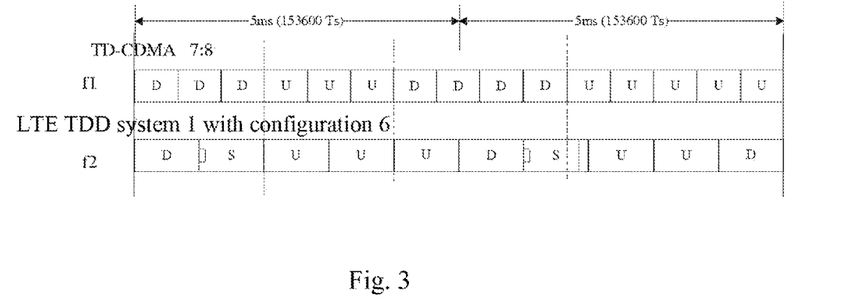
FIG. 3 is a schematic diagram 1 of a coexistence condition of adjacent frequencies in a carrier uplink and downlink configuration.

As illustrated in FIG. 3, an operator deploys a TD-CDMA network at a frequency point f1 (for example, with an uplink and downlink configuration of 7:8) and also an LTE-TDD system 1 at a frequency point f2 adjacent to f1, so an uplink and downlink configuration of the LTE-TDD system 1 shall be configured according to the configuration 6 in Table 1 in view of required coexistence of the adjacent frequencies, so as to obviate inter-system interference.

Figure 4:
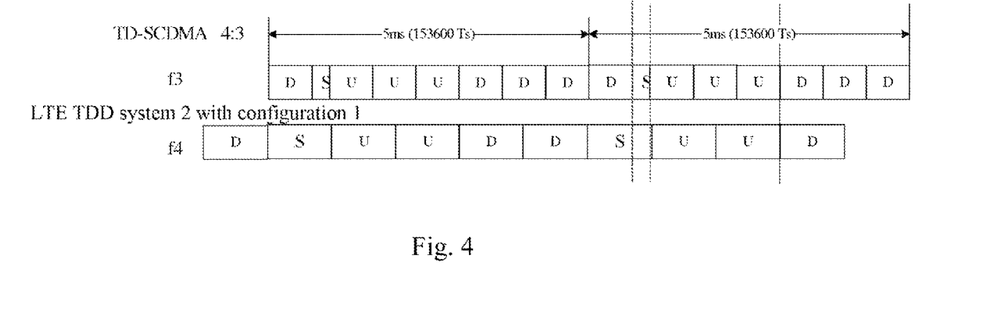
FIG. 4 is a schematic diagram 2 of a coexistence condition of adjacent frequencies in a carrier uplink and downlink configuration.

As illustrated FIG. 4, TD-SCDMA (for example, with an uplink and downlink configuration of 4:3) is deployed at a frequency point f3 and also an LTE-TDD system 2 is deployed at a frequency point f4 adjacent to f3, so an uplink and downlink configuration of the LTE-TDD system 2 shall be configured according to the configuration 1 in Table 1 in view of required coexistence of the adjacent frequencies, so as to obviate inter-system interference.

Also, in order to ensure that an LTE-A system can provide an LTE-A UE with a wider system bandwidth, it is required to simultaneously allocate a plurality of carriers with the same uplink or downlink sub-frames to the same LTE-A UE for use, there needed to be at least one identical uplink sub-frame and at least one identical downlink sub-frame between at least two component carriers when the uplink and downlink configuration performed, so as to provide the LTE-A UE with a sufficient bandwidth for data transmission.

Furthermore, it is required that a configuration of at least one component carrier complies with an uplink and downlink configuration of R8 to ensure downward compatibility of the component carrier with R8.

The foregoing description presents the conditions to be satisfied to perform uplink and downlink configurations of the component carriers. Particularly, the uplink and downlink configurations of the component carriers can be performed preferably as follows:

It is determined whether contiguous or non-contiguous carrier aggregation applies in the cell, and if contiguous carrier aggregation applies, then the same uplink and downlink configuration is performed for all of the component carriers; or if non-contiguous carrier aggregation applies in the cell, then uplink and downlink configurations are performed separately for each of the component carriers.

Particularly, in the case of contiguous aggregation of the component carriers, preferably the same uplink and downlink configuration is configured for each carrier because different uplink and downlink allocation configured for each of the adjacent-frequent carriers may cause interference between the uplink and the downlink across adjacent frequency bands. Of course, different uplink and downlink configurations can be performed as an alternative, where the issue of adjacent-frequent interference has to be addressed.

In the case of non-contiguous aggregation of the component carriers, different uplink and downlink configurations can be performed without incurring the foregoing issue of interference because the carriers are not adjacent to each other in the spectrum. However, the uplink and downlink configurations of the respective component carriers and shall also satisfy the foregoing requirement on coexistence with those of their adjacent-frequency carriers.

With each of the component carriers configured as above, all or a part of the component carriers can comply with an uplink and downlink configuration of R8, and particularly, uplink and downlink configuration selected for each carrier can be selectively combined at discretion so long as the foregoing limiting conditions of required coexistence between adjacent frequencies, etc., are satisfied.

The step 202 is to transmit the uplink and downlink configuration of each component carrier and those of the other component carriers aggregated with the component carrier to an LTE-A UE accessing the corresponding component carrier.

In this step, the uplink and downlink configurations can be transmitted particularly by notifying the UE accessing the corresponding carrier in a broadcast message over the carrier or in upper layer signaling over the carrier.

The uplink and downlink configurations of the other component carriers aggregated with a carrier A can be transmitted in a variety of ways, for example, by issuing sequentially or incrementally the uplink and downlink configurations of the other respective carrier components aggregated with the carrier A. In so-called sequential transmission, firstly the UE is notified about whether of being the same as the uplink and downlink configuration, and then the uplink and downlink configurations of those component carriers different from that of the carrier A are transmitted sequentially. In so-called incremental transmission, the uplink and downlink configurations of the other component carriers can be transmitted only if the uplink and downlink configurations of the other component carriers differ from that of the carrier A; otherwise, the uplink and downlink configurations of the other component carriers are considered to be the same as that of the carrier A.

Preferably, the uplink and downlink configuration of each of the component carriers can further be transmitted to an LTE R8 UE accessing the corresponding carrier to enable the LTE R8 LTE to transmit and receive data in the LTE-A system, thereby ensuring downward compatibility with R8. In this respect, the uplink and downlink configurations of any carrier A and the other component carriers can be transmitted over the carrier A through different physical or logic resources, for example, over different broadcast channel or by encapsulating them in different data packets for transmission, so that the LTE R8 UE will receive the uplink and downlink configuration of only the current carrier and the LTE-A UE can receive the uplink and downlink configurations of the current carrier and the other component carriers.

The general flow of the uplink and downlink configuration method according to the invention has been finished so far.

In correspondence to the foregoing uplink and downlink configuration method, the invention further provides an uplink and downlink configuration reception method. In this reception method, an LTE-A UE receives uplink and downlink configurations, particularly by receiving uplink and downlink configurations of each of carriers and those of the other carriers aggregated with the carrier transmitted from a base station, and therefore can transmit data over a plurality of aggregated carriers during subsequent data transmission to improve a data transmission bandwidth of a system. Also since the uplink and downlink configurations of each of the carriers can further be transmitted to an LTE R8 UE accessing the carrier after the uplink and downlink configurations are performed according to the invention, the LTE R8 UE can also receive the uplink and downlink configuration of a carrier accessed by the LTE R8 UE transmitted from the base station. Particularly:

The LTE R8 UE accessing each of LTE TDD carriers shall acquire the uplink and downlink configuration of the current carrier, particularly from a broadcast message transmitted over the carrier;

The LTE A UE accessing each of LTE TDD carriers shall acquire the uplink and downlink configurations of the other carriers aggregated with the carrier to provide a wider transmission bandwidth, particularly as follows:

A) The uplink and downlink configurations are acquired from a broadcast message over the current carrier, that is, information on the uplink and downlink configurations of the other aggregated carriers is broadcast over the current carrier in addition to that of the latter. The broadcast message can alternatively be transmitted incrementally, that is, by firstly notifying about whether the uplink and downlink configurations over the respective carriers are the same as that of the current carrier and then broadcasting information on the uplink and downlink configurations over only those component carriers different from that of the current carrier.

B) The uplink and downlink configurations are acquired from upper layer signaling over the current carrier, for example, by notifying upon setup of an RRC connection. Similarly, the uplink and downlink configurations can alternatively be notified about in the upper layer signaling incrementally, that is, by notifying about specific information on the uplink and downlink configurations of the other carriers only if the uplink and downlink configurations of the other carriers differ from that of the current carrier; otherwise, by simply indicating that the uplink and downlink configurations of the corresponding carriers are the same as that of the current carrier.

Uplink and downlink configurations can be performed and received in the LTE-A system as described above, and thus such a condition is prepared to provide the LTE-A UE with a wider system bandwidth. Preferably after the foregoing configurations are performed, an LTE-A UE can be scheduled in sub-frames, all of which are in the uplink or downlink, over a plurality of aggregated component carriers when the LTE-A UE intends to receive or transmit data concurrently over the carriers to accommodate a demand for a wider bandwidth.

Figure 5:
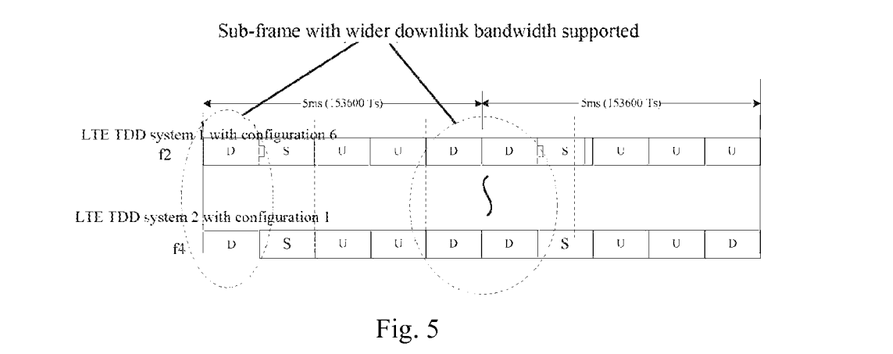
FIG. 5 is a schematic diagram of carrier allocation when a wider downlink bandwidth is required for an LTE-A UE.

For example, if a certain LTE-A UE demands for a wider downlink width (intends to receive data concurrently over a plurality of carriers), then the base station can select a part of a plurality of aggregated carriers and schedule the LTE-A UE in sub-frame, all of which are in the downlink, over these carriers, as illustrated in FIG. 5.

Figure 6:
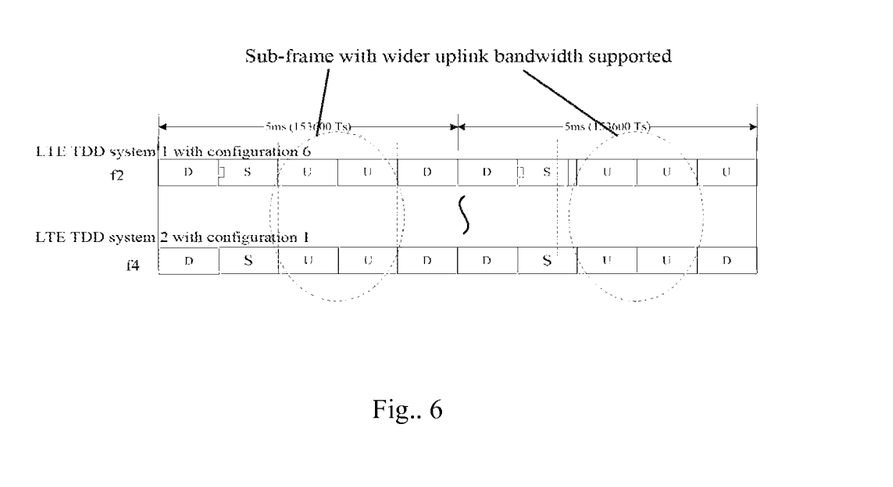
FIG. 6 is a schematic diagram of carrier allocation when a wider uplink bandwidth is required for an LTE-A UE.

This also applies to support a wider uplink width, as illustrated in FIG. 6.

Furthermore, it shall be further ensured when practicing the invention to maintain precise synchronization and particularly alignment of radio frames and sub-frames between LTE-TDD systems over different carriers.

An embodiment of the invention proposes a transmission device with multi-carrier aggregation including:

A configuration module configured to perform uplink and downlink configurations for each of the component carriers aggregated in a cell and ensuring coexistence of at least one identical uplink sub-frame and at least one identical downlink sub-frame between at least two of the component carriers and compliance of the configuration of at least one of the component carriers with an uplink and downlink configuration of R8; and A transmission module configured to transmit the uplink and downlink configuration of any one of the component carriers and those of the other component carriers aggregated with the any one component carrier to an LTE-A UE accessing the corresponding component carrier.

The configuration module is configured to determine whether contiguous or non-contiguous carrier aggregation applies in the cell, and if contiguous carrier aggregation applies, then perform the same uplink and downlink configuration for all of the component carriers; or if non-contiguous carrier aggregation applies in the cell, then perform uplink and downlink configurations separately for the respective component carriers.

The transmission module is configured to transmit the uplink and downlink configuration of the any component carrier and those of the other component carriers aggregated with the component carrier in a broadcast message; or The transmission module is configured to transmit the uplink and downlink configuration of the any component carrier and those of the other component carriers aggregated with the component carrier in upper layer signaling over the component carrier.

The transmission module transmits the uplink and downlink configurations of the other component carriers aggregated with the component carrier by:

Transmitting sequentially the uplink and downlink configurations of the other component carriers aggregated with the component carrier; or Transmitting information on whether the uplink and downlink configurations of the other component carriers are the same as that of the component carrier and the uplink and downlink configurations of the other component carriers different from that of the component carrier; or Transmitting the uplink and downlink configurations of the other component carriers different from that of the component carrier.

In view of the case on multi-carrier aggregation, the solution according to the invention proposes a CP configuration solution in which a correspondence relationship table between respective component carriers subject to multi-carrier aggregation and lengths of cyclic prefixes configured for the component carriers is preconfigured at the transmission end, e.g., a base station or a UE. Further to the foregoing uplink and downlink configuration solution, a transmission process includes the following steps:

The transmission end performs Inverse Discrete Fourier Transform on data over each component carrier to acquire OFDM symbols over the respective component carriers; and The transmission end inserts a cyclic prefix in the time domain of each of the component carriers according to the preconfigured correspondence relationship table so that the cyclic prefix and a predetermined number of OFDM symbols over the component carrier constitute a sub-frame.

The same correspondence relationship table as that of the transmission end is configured at the reception end. The reception end is the UE if the transmission end is the base station, or the reception end is the base station if the transmission end is the UE, and a process at the reception end includes the following steps:

The reception end performs an operation of removing the cyclic prefix from the sub-frame received over each of the component carriers according to the preconfigured correspondence relationship table, so as to acquire the OFDM symbols over the component carrier; and The reception end performs Discrete Fourier Transform on the OFDM symbols over the component carrier.

Figure 7:
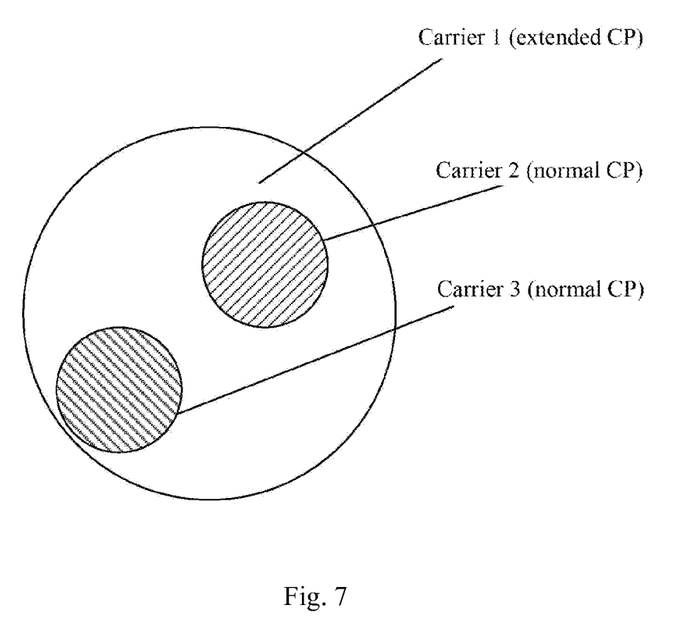
FIG. 7 is a schematic diagram of coverage ranges of component carriers in an LTE-A system with multi-carrier aggregation according to an embodiment of the invention.

In the solution proposed according to the invention, CP lengths over a plurality of carriers can be configured separately, that is, the same or different CP lengths can be configured for different carriers, in an LTE-A system with carrier aggregation, and in view of a possible access of an LTE R8 User Equipment (UE) over each of the carriers, the basic parameters of a normal CP and an extended CP specified in R8 as depicted in Table 2 continues to be used for a specific CP configuration. Taking an LTE-A system with aggregation of two carriers as an example, a carrier 1 and a carrier 2 are subject to multi-carrier aggregation to provide an LTE-A user with a wider transmission bandwidth, as illustrated in FIG. 7, where the carrier 1 is configured with an extended CP for a larger coverage range, and the carrier 2 and a carrier 3 providing a hotspot with a wider transmission bandwidth are configured with a normal CP. Particularly, the respective carriers may or may not be adjacent across their frequencies. A circle corresponding to each of the carriers represents a coverage range of the carrier.

An LTE R8 UE can operate only over a specific carrier, and its CP type and operation mode are substantially the same as in the prior art.

Figure 8:
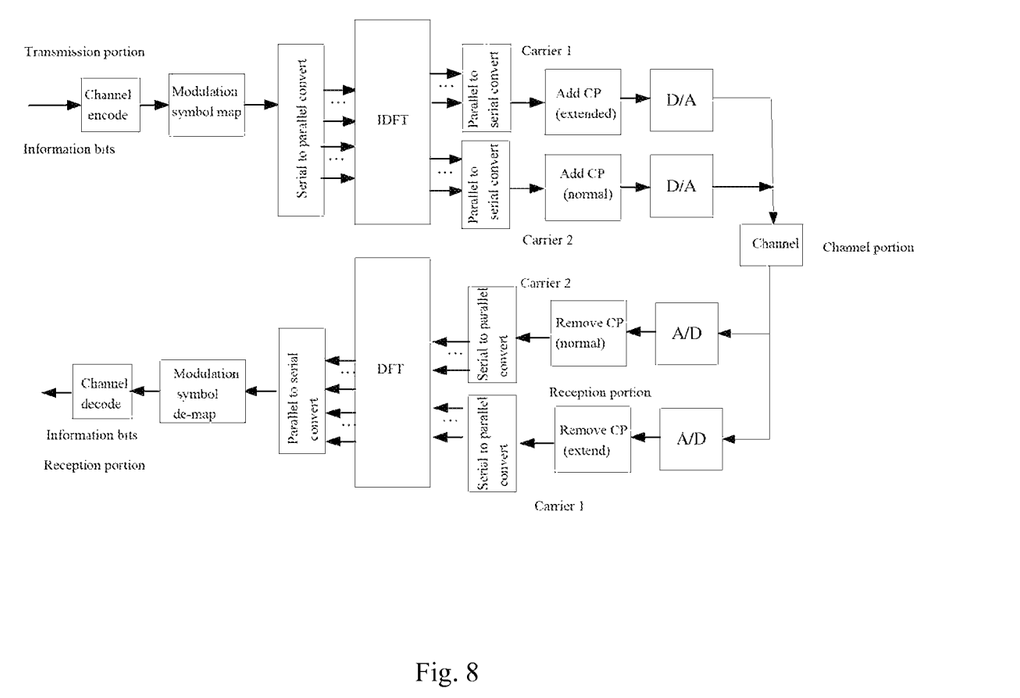
FIG. 8 is a flow chart of a CP configuration process for multi-carrier aggregation according to an embodiment of the invention.
Figure 9:
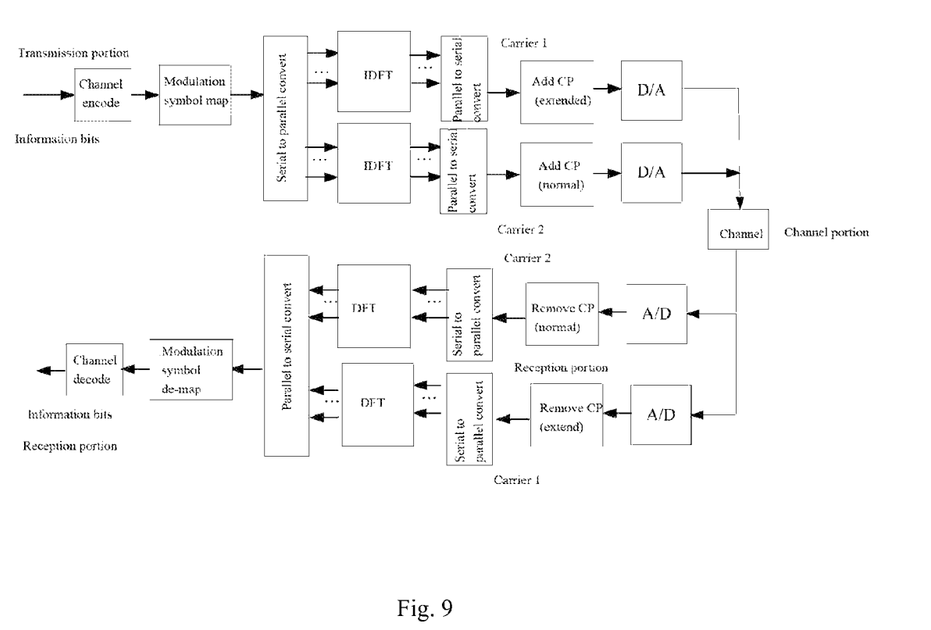
FIG. 9 is a flow chart of another CP configuration process for multi-carrier aggregation according to an embodiment of the invention.

An LTE-A UE can transmit and receive data concurrently over a plurality of carriers and therefore is required to be capable of processing both data with a normal CP and data with an extended CP concurrently. As illustrated in FIG. 8 or FIG. 9, for transmission of uplink data from a UE, firstly the data is channel-encoded, modulation symbol-mapped and serial to parallel-converted, next Inverse Discrete Fourier Transform (IDFT) is performed on the data transmitted over a plurality of carriers to acquire OFDM symbols, and thereafter a normal CP or an extended CP is inserted in the time domain according to a correspondence relationship between specific data and component carriers; and finally digital/analog (D/A) conversion is performed on the data and the data is modulated to the radio frequency for transmission. IDFT performed on the data transmitted over the carriers can be IDFT uniform across the respective carriers as illustrated in FIG. 8 or IDFT independent across the respective carriers as illustrated in FIG. 9 dependent upon designed parameters of the LTE-A system. A base station transmitting downlink data will perform the same process as described above except for the downlink data instead of the uplink data.

For reception of downlink data at the base station, firstly a radio frame signal is transformed from the radio frequency to the base band and analog/digital (A/D) converted, and thereafter an operation of removing a CP is performed by a CP length in a preconfigured correspondence relationship table; next serial to parallel conversion and then Discrete Fourier Transform (DFT) are performed to demodulate OFDM symbols; and the demodulated data is further parallel to serial-converted, modulation symbol-de-mapped and channel-decoded sequentially into information bits received at the LTE-A UE. DFT can be DFT uniform across the respective carriers as illustrated in FIG. 3 or DFT independent across the respective carriers as illustrated in FIG. 9 dependent upon designed parameters of the LTE-A system. The base station receive uplink data will perform the same process as described above except for the uplink data instead of the downlink data.

Multi-carrier aggregation described above as an example relates only two component carriers, and a scenario in which more component carriers are subject to multi-carrier aggregation will be apparent to those skilled in the art in light of the foregoing example, so a repeated description thereof will be omitted here.

The LTE-A UE can configure the correspondence relationship table between component carriers and CP lengths only after acquiring CP lengths configured over the respective carriers in the system. The LTE-A UE acquires and configures the correspondence relationship table as follows:

The LTE-A UE searches for the cell to detect the type of a downlink cyclic prefix for a first component carrier subject to multi-carrier aggregation;

The LTE-A UE receives a message over the first component carrier according to the type of the downlink cyclic prefix and acquires, from the message, information on a configured uplink cyclic prefix for the first component carrier as well as information on configured uplink cyclic prefixes and information on configured downlink cyclic prefixes for the other component carriers subject to multi-carrier aggregation; and The LTE-A UE configures a correspondence relationship table between component carriers and configuration information on cyclic prefixes according to the acquired information on the configured uplink cyclic prefixes and information on the configured downlink cyclic prefixes for each of the component carriers.

Figure 10:
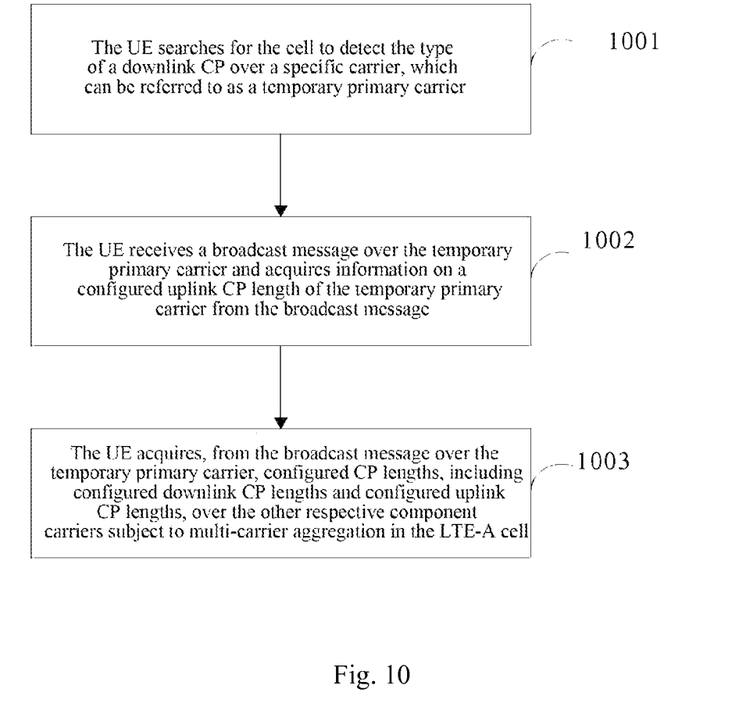
FIG. 10 is a flow chart of a UE acquiring CP length configurations of each of the component carriers according to an embodiment of the invention.

An embodiment of the invention proposes a method for a UE to acquire CP lengths configured over respective carriers in a broadcast message, where a base station transmits, over each of component carriers subject to multi-carrier aggregation in respective cells, a broadcast message including uplink and downlink CP lengths configured over the current carrier and uplink and downlink CP lengths configured over the other component carriers subject to multi-carrier aggregation. As illustrated in FIG. 10, a process at the UE side includes the following steps:

Step 1001: The UE searches for the cell to detect the type of a downlink CP over a specific carrier, which can be referred to as a temporary primary carrier. The UE can detect the type of a downlink CP particularly as follows: the UE searches for the cell, detects a synchronization signal over a specific carrier and detects the CP type from a temporal relationship with the synchronization signal.

Step 1002: The UE receives a broadcast message over the temporary primary carrier and acquires information on a configured uplink CP length of the temporary primary carrier from the broadcast message.

Step 1003: The UE acquires, from the broadcast message over the temporary primary carrier, configured CP lengths, including configured downlink CP lengths and configured uplink CP lengths, over the other respective component carriers subject to multi-carrier aggregation in the LTE-A cell.

Alternatively, the base station transmits configured CP lengths, including configured downlink and uplink CP lengths, over the respective carriers subject to multi-carrier aggregation to the UE in other upper layer signaling in the LTE-A cell. The upper layer signaling can be dedicated signaling or signaling of a specific control flow, e.g., Radio Resource Control (RRC) signaling.

The LTE-A UE and the base station perform a specific service after the LTE-A UE acquires the configured uplink and downlink CP lengths over the respective component carriers.

The base station may schedule the UE over a corresponding carrier in a specific scheduling policy according to the service to be performed for the LTE-A UE. Particularly, the base station can schedule the UE with a strict transmission quality or coverage requirement (e.g., a VoIP user) over a carrier with a long CP and the UE with a loose coverage requirement or a strict efficiency requirement (e.g., a high-speed data transmission user) over a carrier with a short CP; and the base station shall be capable of dealing with different CP lengths over the respective carriers concurrently for the UE with concurrent transmission and reception at a higher peak rate over all of the carriers.

Figure 11:
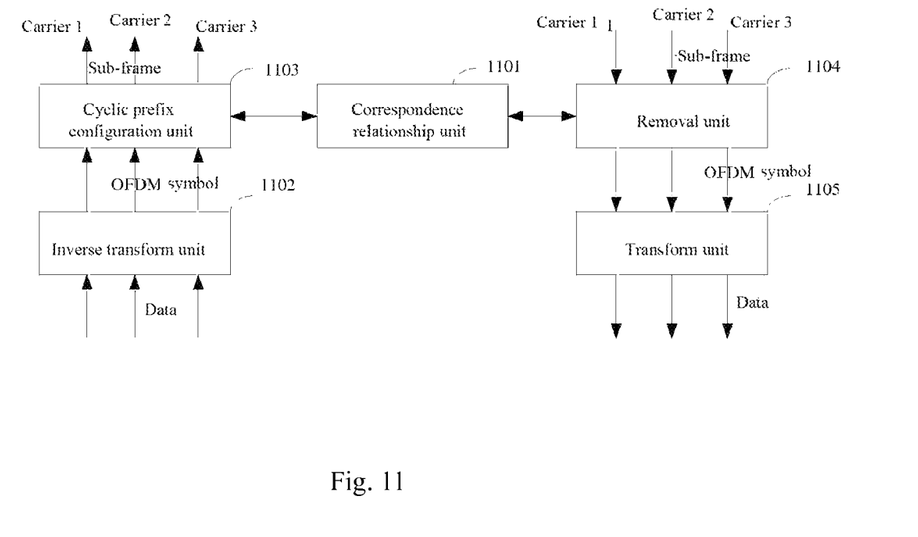
FIG. 11 is block diagram of a cyclic prefix configuration device for multi-carrier aggregation according to an embodiment of the invention.

FIG. 11 is block diagram of a cyclic prefix configuration device for multi-carrier aggregation according to an embodiment of the invention, which includes:

A correspondence relationship unit 1101 configured to pre-configure a correspondence relationship table between each carrier subject to the multi-carrier aggregation and cyclic prefixes configured for the component carriers;

An inverse transform unit 1102 configured to perform Inverse Discrete Fourier Transform on data over the each carrier to acquire Orthogonal Frequency Division Multiplexing (OFDM) symbols over each data carrier; and A cyclic prefix configuration unit 1103 configured to insert a cyclic prefix in the time domain of each of the component carriers according to the correspondence relationship table preconfigured by the correspondence relationship unit 1101 so that the cyclic prefix and a predetermined number of OFDM symbols over the component carrier acquired by the inverse transform unit 1102 constitute a sub-frame.

The device further includes:

A removal unit 1104 configured to perform an operation of removing the cyclic prefix from the sub-frame received over each of the component carriers according to the correspondence relationship table preconfigured by the correspondence relationship unit 1101 to acquire the OFDM symbols over the component carrier; and A transform unit 1105 configured to perform Discrete Fourier Transform on the OFDM symbols over each of the component carriers acquired by the removal unit 1104.

Preferably, the inverse transform unit 1102 includes a plurality of inverse transform sub-units, each of which corresponds to one of the component carriers and is configured to perform Inverse Discrete Fourier Transform on the data over the corresponding component carrier.

Preferably, the transform unit 1105 includes a plurality of transform sub-units, each of which corresponds to one of the component carriers and is configured to perform Discrete Fourier Transform on the OFDM symbols over the corresponding component carrier.

As can be apparent from the embodiments of the invention, the invention can address the issue of uplink and downlink configurations over different component carriers in an LTE-A TDD system by performing the configurations of the components carriers as R8 compliant uplink and downlink configurations as needed for downlink compatibility with R8 or by determining other appropriate uplink and downlink configurations for better transmission performance. Furthermore, the inventive solution pre-configures a correspondence relationship table between each component carrier and cyclic prefixes configured for the component carriers and inserts cyclic prefixes in the time domain of each component carrier according to the correspondence relationship table to thereby configure each component carrier, subject to multi-carrier aggregation, with the cyclic prefixes which may be the same or different. The invention addresses the issue of CP lengths configured over each carrier for LTE-A transmission with carrier aggregation.

The foregoing description is intended to merely illustrative of the preferred embodiments of the invention but not to limit the invention, and any modifications, substitutions and adaptations made without departing from the spirit and principle of the invention shall be encompassed in the scope of the invention.

What is claimed is:

1. A transmission method with Time Division Duplex (TDD) multi-carrier aggregation, comprising:
    performing uplink and downlink configurations for each of a plurality of component carriers aggregated in a cell while ensuring coexistence of at least one identical uplink sub-frame and at least one identical downlink sub-frame between at least two of the component carriers and compliance of the configuration of at least one of the component carriers with an uplink and downlink configuration of R8; and
    transmitting the uplink and downlink configuration of any one of the component carriers and those of other component carriers aggregated with the any one of the component carriers to an LTE-A UE accessing a corresponding component carrier, wherein the LTE-A UE is scheduled over sub-frames that are all in the uplink or downlink in a plurality of aggregated component carriers when the LTE-A UE is to receive or transmit data simultaneously over a plurality of carriers.

2. The method according to claim 1, wherein, the step of performing uplink and downlink configurations for each of the component carriers aggregated in a cell comprises:
    performing the same uplink and downlink configuration for each of the component carriers aggregated together; or performing different uplink and downlink configurations for each of the component carriers aggregated together.

3. The method according to claim 1, wherein, the step of performing uplink and downlink configurations for each of the component carriers aggregated in a cell comprises: determining whether contiguous or non-contiguous carrier aggregation applies in the cell, and if contiguous carrier aggregation applies, then performing the same uplink and downlink configuration for all of the component carriers, or if non-contiguous carrier aggregation applies, then performing uplink and downlink configuration separately for each of the component carriers.

4. The method according to claim 1, wherein, the step of transmitting the uplink and downlink configuration of any one of the component carriers and those of the other component carriers aggregated with the any one of the component carrier to an LTE-A UE accessing the corresponding component carrier comprises:
   transmitting the uplink and downlink configuration of the any one of the component carriers and those of the other component carriers aggregated with the any one of the component carrier in a broadcast message; or
   transmitting the uplink and downlink configuration of the any one of the component carrier and those of the other component carriers aggregated with the any one of the component carriers in upper layer signaling over the any one of the component carriers.

5. The method according to claim 4, wherein, the step of transmitting the uplink and downlink configurations of the other component carriers aggregated with the any one of the component carrier comprises:
   transmitting the uplink and downlink configurations of the other component carriers aggregated with the any one of the component carriers sequentially; or
   transmitting information on whether the uplink and downlink configurations of the other component carriers are the same as that of the any one of the component carriers and the uplink and downlink configurations of the other component carriers different from that of the any one of the component carriers; or
   transmitting the uplink and downlink configurations of the other component carriers different from that of the any one of the component carrier.

6. The method according to claim 1, further comprising: after performing the uplink and downlink configurations for each of the component carriers, transmitting the uplink and downlink configuration of any one of the component carriers to an LTE R8 UE accessing the corresponding component carrier.

7. The method according to claim 1, wherein, a correspondence relationship table between each component carrier subject to the multi-carrier aggregation and lengths of cyclic prefixes configured for the component carrier is preconfigured at the LTE-A UE, and the step of scheduling the LTE-A UE over sub-frames, all of which are in the uplink or downlink, over a plurality of aggregated component carriers comprises:
   performing, by the LTE-A UE, Inverse Discrete Fourier Transform on data over each component carrier to acquire Orthogonal Frequency Division Multiplexing symbols over the respective component carriers; and
   inserting, by the LTE-A UE, a cyclic prefix in the time domain of each of the component carriers according to the preconfigured correspondence relationship table so that the cyclic prefix and a predetermined number of OFDM symbols over the component carrier constitute a sub-frame.

8. The method according to claim 7, wherein, the step of performing Inverse Discrete Fourier Transform on data over each component carrier comprises performing Inverse Discrete Fourier Transform respectively on the data over each component carrier or performing Inverse Discrete Fourier Transform uniformly on the data over each component carrier.

9. The method according to claim 7, wherein, the LTE-A UE configures the correspondence relationship table by:
   searching for the cell to detect the type of a downlink cyclic prefix for a first component carrier subject to multi-carrier aggregation;
   receiving a message over the first component carrier according to the type of the downlink cyclic prefix and acquiring, from the message, information on a configured uplink cyclic prefix for the first component carrier as well as information on configured uplink cyclic prefixes and information on configured downlink cyclic prefixes for the other component carriers subject to multi-carrier aggregation; and
   configuring the correspondence relationship table between the component carriers and information on configured cyclic prefixes according to the acquired information on the configured uplink cyclic prefixes and information on the configured downlink cyclic prefixes for each of the component carriers.

10. The method according to claim 9, further comprising: after the step of acquiring by the LTE-A UE, from the message, information on a configured uplink cyclic prefix for the first component carrier as well as information on configured uplink cyclic prefixes and information on configured downlink cyclic prefixes for the other component carriers subject to multi-carrier aggregation,
   scheduling, by a base station, the LTE-A UE over the corresponding component carrier in a scheduling policy according to a service to be preformed for the UE.

11. The method according to claim 10, wherein, scheduling, by the base station, the LTE-A UE over the corresponding component carrier in a scheduling policy comprises:
   determining, by the base station, whether a transmission quality required for the service is above a predetermined transmission quality threshold or a required coverage range is above a predetermined coverage range threshold or a required transmission efficiency is below a predetermined transmission efficiency threshold, and if so, then scheduling the LTE-A RE over a component carrier configured with an extended cyclic prefix; or otherwise, scheduling the LTE-A RE over a component carrier configured with a normal cyclic prefix.

12. The method according to claim 11, wherein, scheduling, by the base station, the LTE-A UE over the corresponding component carrier in a scheduling policy comprises:
   determining, by the base station, whether the amount of data required for the service is above a predetermined amount-of-data threshold, and if so, then scheduling the LTE-A RE to operate over more than one component carriers.

13. A transmission method with Time Division Duplex (TDD) multi-carrier aggregation, comprising:
   receiving, by an LTE-A UE, over an access carrier thereof, an uplink and downlink configuration of the access carrier and those of other component carriers aggregated with the access carrier transmitted from a base station; and
   receiving, by an LTE UE, over the access carrier thereof by the LTE UE, an uplink and downlink configuration of the access carrier transmitted from the base station, wherein physical or logic resources are preset over each component carrier to carry information on the uplink and downlink configuration of a current carrier and those of other carriers aggregated with the current carrier:

extracting, by the LTE-A UE, the uplink and downlink configuration of the access carrier over the physical or logic resource preset over the access carrier to carry the information on the uplink and downlink configuration of the access carrier and extracting the uplink and downlink configurations of the other carriers aggregated with the access carrier over the physical or logic resource preset over the access carrier to carry the information on the uplink and downlink configuration of the other carriers aggregated with the access carrier, wherein the LTE-A UE is scheduled over sub-frames that are all in the uplink or downlink in a plurality of aggregated carriers when the LTE-A UE is to receive or transmit data simultaneously over a plurality of carriers; and extracting, by the LTE UE, the uplink and downlink configuration of the access carrier over the physical or logic resource preset over the access carrier to carry the information on the uplink and downlink configuration of the access carrier.

14. A transmission device with Time Division Duplex (TDD) multi-carrier aggregation, comprising:
 a configuration module configured to perform uplink and downlink configurations for each of a plurality of component carriers aggregated in a cell while ensuring coexistence of at least one identical uplink sub-frame and at least one identical downlink sub-frame between at least two of the component carriers and compliance of the configuration of at least one of the component carriers with an uplink and downlink configuration of R8; and
 a transmission module configured to transmit the uplink and downlink configuration of any one of the component carriers and those of other component carriers aggregated with the any one of the component carriers to an LTE-A UE accessing a corresponding component carrier wherein the LTE-A UE is scheduled over sub-frames that are all in the uplink or downlink in a plurality of aggregated component carriers when the LTE-A UE is to receive or transmit data simultaneously over a plurality of carriers.

15. The device according to claim 14, wherein, the transmission module is configured to transmit the uplink and downlink configuration of the any one of the component carriers and those of the other component carriers aggregated with the any one of the component carriers in a broadcast message; or
 the transmission module is configured to transmit the uplink and downlink configuration of the any one of the component carriers and those of the other component carriers aggregated with the any one of the component carriers in upper layer signaling of the any one of the component carrier.

16. The device according to claim 15, wherein, the transmission module transmits the uplink and downlink configurations of the other component carriers aggregated with the any one of the component carriers by:
 transmitting the uplink and downlink configurations of the other component carriers aggregated with the any one of the component carriers sequentially; or
 transmitting information on whether the uplink and downlink configurations of the other component carriers are the same as that of the any one of the component carriers and the uplink and downlink configurations of the other component carriers different from that of the any one of the component carriers; or
 transmitting the uplink and downlink configurations of the other component carriers different from that of the any one of the component carriers.

17. The device according to claim 14, further comprising:
 a removal unit configured to perform an operation of removing the cyclic prefix from the sub-frame received over each of the component carriers according to the correspondence relationship table preconfigured by the correspondence relationship unit to acquire the OFDM symbols over each component carrier; and
 a transform unit configured to perform Discrete Fourier Transform on the OFDM symbols over each of the component carriers acquired by the removal unit.

18. The device according to claim 14, wherein, the inverse transform unit comprises a plurality of inverse transform sub-units, each of which corresponds to one of the component carriers and is configured to perform Inverse Discrete Fourier Transform on the data over the corresponding component carrier.

19. The device according to claim 17, wherein, the transform unit comprises a plurality of transform sub-units, each of which corresponds to one of the component carriers and is configured to perform Discrete Fourier Transform on the OFDM symbols over the corresponding component carrier.

* * * * *